(12) United States Patent
Gustin

(10) Patent No.: US 10,344,809 B2
(45) Date of Patent: Jul. 9, 2019

(54) CLUTCH CONTROL

(71) Applicant: VOLVO TRUCK CORPORATION, Göteborg (SE)

(72) Inventor: Jonas Gustin, Landvetter (SE)

(73) Assignee: Volvo Truck Corporation, Göteborg (SE)

( * ) Notice: Subject to any disclaimer, the term of this patent is extended or adjusted under 35 U.S.C. 154(b) by 245 days.

(21) Appl. No.: 15/314,052

(22) PCT Filed: Jun. 17, 2014

(86) PCT No.: PCT/EP2014/001643
§ 371 (c)(1),
(2) Date: Nov. 25, 2016

(87) PCT Pub. No.: WO2015/192861
PCT Pub. Date: Dec. 23, 2015

(65) Prior Publication Data
US 2018/0231073 A1    Aug. 16, 2018

(51) Int. Cl.
*F16D 48/02*    (2006.01)
*F16D 25/0638*   (2006.01)
*F16H 63/30*    (2006.01)

(52) U.S. Cl.
CPC ......... *F16D 48/02* (2013.01); *F16D 25/0638* (2013.01); *F16H 63/3026* (2013.01);
(Continued)

(58) Field of Classification Search
None
See application file for complete search history.

(56) References Cited

U.S. PATENT DOCUMENTS 4,428,471 A * 1/1984 Parker .................. F16D 25/088
192/85.56
5,048,656 A   9/1991 Braun
(Continued)

FOREIGN PATENT DOCUMENTS

CN      101903663 A    12/2010
DE   102009017063 A1   10/2010
(Continued)

OTHER PUBLICATIONS

Chinese Official Action (dated Jun. 21, 2018) for corresponding Chinese App. 201480079911.6.
(Continued)

*Primary Examiner* — Timothy Hannon
(74) *Attorney, Agent, or Firm* — WRB-IP LLP

(57) ABSTRACT

A method is provided for controlling a friction clutch for connecting first and second rotatable axles in a vehicle, where the clutch includes a first friction part which is connected to the first axle, a second friction part which is connected to the second axle, a spring element which is adapted to bias the second friction part into engagement with the first friction part to connect the first and second axles, and an actuator including a movable actuator part which is engageable with the spring element, and adapted to move, upon being subjected to an actuation force from an actuator control system, towards a disengagement position, thereby deforming the spring element to disengage the second friction part from the first friction part to disconnect the first and second axles. The method includes subjecting the movable actuator part to a test force urging the movable actuator part towards the disengagement position, the test force being smaller than the actuation force, and subsequently or simultaneously to subjecting the movable actuator part to the test force, determining a position of the movable actuator part.

18 Claims, 4 Drawing Sheets

(52) U.S. Cl.
CPC ............ *F16D 2048/0212* (2013.01); *F16D 2500/50233* (2013.01); *F16H 2063/3036* (2013.01)

(56) References Cited

U.S. PATENT DOCUMENTS

| | | |
|---|---|---|
| 6,062,366 A | 5/2000 | Herzig et al. |
| 6,116,399 A | 9/2000 | Drexl et al. |
| 6,234,290 B1 | 5/2001 | Drexl et al. |
| 2002/0000356 A1* | 1/2002 | Bjorkgard ........... F16D 25/0635 192/85.58 |
| 2005/0155826 A1* | 7/2005 | Kohno ................. F16D 13/583 188/79.61 |
| 2009/0223772 A1* | 9/2009 | Burkhart .............. F16D 13/752 192/70.252 |
| 2014/0083810 A1 | 3/2014 | Hwang |

FOREIGN PATENT DOCUMENTS

| | | |
|---|---|---|
| DE | 102009024779 A1 | 12/2010 |
| DE | 102011119990 A1 | 6/2013 |
| DE | 2013217592 A1 | 3/2014 |
| WO | 2003019026 A1 | 3/2003 |
| WO | 2005080816 A1 | 9/2005 |
| WO | 2014050725 A1 | 4/2014 |

OTHER PUBLICATIONS

International Search Report (dated Feb. 25, 2015) for corresponding International App. PCT/EP2014/001643.
International Preliminary Report on Patentability (dated Jul. 8, 2016) for corresponding International App. PCT/EP2014/001643.

\* cited by examiner

CLUTCH CONTROL

BACKGROUND AND SUMMARY

The invention relates to a method for controlling a friction clutch for connecting first and second rotatable axles in a vehicle, e.g. an input shaft of a transmission and a crankshaft of an engine. The invention also relates to a computer program, a computer readable medium, and a controller for performing the steps of the method.

As is known, a clutch is used in a vehicle for connecting a first rotatable axle in the form of an input shaft of a transmission, and second rotatable axle in the form of a crankshaft of an engine. Dry friction clutches are widely used as master clutches in manual, automated and automatic mechanically engaged vehicle transmissions.

In such a clutch, a first friction part in the form of a disc is rotationally connected to the transmission input shaft. The disc is arranged to be pressed axially and clamped by a spring system between second and third friction parts in the form of two friction plates which are connected to the engine crankshaft. In some clutches two friction discs and or three plates are provided. The third friction part is fixed to the crankshaft while the first and second friction parts are locked in the rotational direction to the transmission input shaft and the crankshaft, respectively, while movable in a non-rotational direction, e.g. axially. Thereby the second friction part can move between positions of engagement and disengagement with the first friction part so as to engage and disengage to clutch.

The spring system comprises a spring element which is locked to the crankshaft, in the rotational direction thereof. The spring element is adapted to bias the second friction part into engagement with the first friction part, so as for the first friction part to be clamped between the second and third friction parts. Upon engagement, torque can be transferred between engine and transmission via friction between the first friction part and the second and third friction parts.

A clutch of the kind referred to here also comprises an actuator, which can be for example pneumatic, hydraulic, or of a non-fluid type, e.g. an electromechanical actuator. The actuator comprises a movable actuator part which is engageable with the spring element. The movable actuator part is adapted to move, usually axially, to provide an actuation force deforming the spring element. Thereby the second friction part is disengaged from the first friction part to disconnect the crankshaft and the transmission input shaft. Thus when disengaging, the spring system is counteracted by an external force exerted by the clutch actuator. Normally, a portion of the actuator is non-rotating, and a release bearing transfers the actuation force to the rotating spring system. The actuator is usually attached to the transmission.

There are two main types of dry friction clutches, characterised by the spring system, namely push-type clutches and pull-type clutches. In push-type clutches, the axial actuation force of the actuator via the release bearing is directed towards the friction parts, and the actuator pushes the spring element out of action. In pull-type clutches the actuator pulls the spring element out of action, and the axial actuator force on the release bearing is directed away from the friction parts. A push-type clutch and a pull-type clutch are shown in FIG. 1 and FIG. 2, respectively, in WO03/019026 A1.

Pull-type clutches may have lower actuation force than push-type clutches for the same clamping force. Hence, pull-type clutches are common in high-torque vehicle applications, e.g., heavy trucks and buses. Push-type clutches, on the other hand, allow a considerably less complicated assembly when joining the transmission to the engine. Since the actuation force is directed towards the clutch, simply axial contact between the movable actuator part and spring system is sufficient. In a pull-type clutch, the movable actuator part needs to be displaced to partly enter inside the spring system. Then, it will be joined with the spring system in a way that enables actuation in the opposite direction, away from the friction parts. A pull-type clutch with an actuator and a connection between release bearing and spring system is shown in FIG. 1 in DE 19716600 A1.

It follows that, at assembly, when joining of engine and transmission with a pull-type clutch, in order for the movable actuator part to mate with the spring system properly, the movable actuator part must be kept in a position extending towards the friction parts.

DE102013217592A1 suggests for this purpose a blocking device adapted to assume a blocking position in which it prevents, restricts, or blocks the movement of the movable actuator part towards the disengagement position. In a non-blocking position, in which it could be still mounted to the clutch or completely removed, the blocking device allows the movement of the movable actuator part towards the disengagement position. While this system provides an advantageous assistance when assembling a pull-type clutch, it is important that the blocking device is removed from the blocking position after the assembly, and that it is not returned to the blocking position during normal operation of the clutch. Failure to remove the blocking device, e.g. after vehicle service or in a new vehicle, before clutch operation can result in damage to the clutch.

It is desirable to ensure correct operation of a vehicle clutch. It is also desirable to ensure correct operation of a vehicle clutch after assembly of the clutch. It is also desirable to reduce or eliminate the risk of damage caused by a blocking device for clutch assembly left in the blocking position at normal use of the clutch.

According to an aspect of the invention, a method is provided for controlling a friction clutch for connecting first and second rotatable axles in a vehicle, where the clutch comprises
- a first friction part which is connected to the first axle,
- a second friction part which is connected to the second axle,
- a spring element which is adapted to bias the second friction part into engagement with the first friction part to connect the first and second axles, and
- an actuator comprising a movable actuator part which is engageable with the spring element, and adapted to move, upon being subjected to an actuation force from an actuator control system, towards a disengagement position, thereby deforming the spring element to disengage the second friction part from the first friction part to disconnect the first and second axles, the method comprising the steps of
- subjecting the movable actuator part to a test force urging the movable actuator part towards the disengagement position, the test force being smaller than the actuation force, and
- subsequently or simultaneously to subjecting the movable actuator part to the test force, determining a position of the movable actuator part.

Determining the position of the movable actuator part upon subjecting it to the test force can be used to provide an indication whether or not the clutch is in order for normal use. If the clutch is not in order for normal use, further use of the clutch can be disallowed or warned against. Thereby improper use of the clutch possibly resulting in damage can be avoided. Since the test force is smaller than the actuation force, the invention makes it possible to use the test force to determine whether the clutch can operate normally, without subjecting it to a force which is large enough to cause damage in case there is a condition in the clutch which can cause damage during normal use. Determining the position of the movable actuator part upon application of the test force can be used for providing an indication of whether the clutch can operate normally, which indication is easy to register, e.g. by a vehicle controller.

Preferably, the position of the movable actuator part is determined upon subjecting the movable actuator part to the test force. Determining the position of the movable actuator part is preferably carried out before subjecting the movable actuator to any further force, subsequent to the test force, by means of the actuator control system. Where determining the position of the movable actuator part is carried out simultaneously to subjecting the movable actuator part to the test force, preferably the position determination is carried out after initiation of the application of the test force to the movable actuator part. Thus, since the test force would normally be applied during a time interval, which however can be short, the position determination should be carried out after the beginning of said time interval. This may allow a movement of the movable actuator part before the position determination.

The clutch can be a pull-type clutch. As stated, the clutch can comprise a blocking device adapted to assume a blocking position in which it prevents the movement of the movable actuator part towards the disengagement position, and a non-blocking position in which it allows the movement of the movable actuator part towards the disengagement position.

Thereby, the method can further comprise determining, based on the determination of the position of the movable actuator part, whether the blocking device is in the blocking position. Thereby, a rigid test can be provided to detect whether the blocking device is in the blocking position.

Preferably, the method comprises comparing the determined position to a fixed reference position. Since the positions of the movable actuator part in engaged and disengaged conditions of the clutch may vary depending on the wear of the friction parts, applying the test force, determining the movable actuator part position, and comparing the latter to the fixed reference position, can make it possible to reliably provide an indication whether or not the clutch is in order for normal use. For example, where the clutch comprises a blocking device as mentioned above, the reference position can be as close to the disengagement position as the movable actuator part can be when the blocking device is in the blocking position. If the movable actuator part position, determined upon application of the test force, is closer to the disengagement position than the reference position, this indicates that the blocking device is in the non-blocking position, and the clutch can be operated normally. This form of reference position is herein also denoted as an obstruction position.

Thus, where the clutch comprises a blocking device as mentioned above, the method can comprise determining whether the movable actuator part position, determined subsequently or simultaneously to subjecting the movable actuator part to the test force, is between the obstruction position and the disengagement position. It should be noted that in case the movable actuator part is, before the test force is applied, in a position which is further away from the disengagement position than the obstruction position, the movable actuator part could move, albeit, if the blocking device is in the blocking position, not further than to the obstruction position. Nevertheless, determining whether the movable actuator part can move to a position between the obstruction position and the disengagement position will provide a clear indication whether the blocking device is in the blocking position.

Preferably, if the blocking device is in the non-blocking position, the test force can move the movable actuator part so that the movable actuator part becomes biased against the spring element. In many pull-type clutch designs, the movable actuator part is biased against the spring element during normal use of the clutch, in particular at the disengagement position of the movable actuator part. However, where the clutch comprises a blocking device as mentioned above, the movable actuator part may not biased against the spring element in the obstruction position. The reason could be that the movable actuator part and the spring element are arranged with a snap arrangement for facilitating the assembly of the clutch. For example, where the spring element is of a diaphragm type, presenting a centred circular hole, the movable actuator part could present a bevelled snap flange. Thereby, during clutch assembly, when the blocking device is in the blocking position, the snap flange passes through the spring element hole, deforming the spring element slightly, after which the spring element "snaps" back to a non-deformed position. As a result, there will be a distance between the snap flange and the spring element in the obstruction position. If the blocking device is thereafter removed, the test force can move the movable actuator part to a position, in which the snap flange moves into contact with, and becomes biased against the spring element.

Preferably, the method comprises determining, based on the movable actuator position determined subsequently or simultaneously to subjecting the movable actuator to the test force, whether to prevent, or disallow, the actuator control system to subject the movable actuator part to the actuation force. This makes it possible to ensure that the clutch is not operated during a suspected operational disorder, for example the blocking device being in the blocking position, whereby damage can be avoided.

The method can comprise determining, based on the movable actuator position determined subsequently or simultaneously to subjecting the movable actuator to the test force, whether to issue an alert signal for an operator of the clutch. This can be used to alert a driver of the vehicle of the clutch disorder so as for this person to avoid any attempt to disengage the clutch.

Preferably, the movable actuator part is subjected to the test force using the actuator control system. Thereby, no substantial additional equipment is needed to carry out the method.

Instead the existing clutch control system can be used, e.g. with an adjustable pressure control to effectuate the differentiation of the test force to the actuation force. Also, no special equipment is needed for the position determination step. Rather, determining the position of the movable actuator part can be carried out by means of a position sensor, which is readily available in a modern vehicle clutch.

Preferably, where the actuator control system comprises a fluid pressure system, e.g. a pneumatic system or a hydraulic system, the test force is controlled at least partly based on feedback from a pressure sensor in the fluid pressure system. Thus, the test force can be controlled by controlling the pressure in the fluid pressure system, based on feedback from the pressure sensor. This provides an arrangement which is simple to implement in existing vehicle clutch control systems. The test force can for example be controlled by means of a valve in the fluid pressure system, the pressure sensor being located between the valve and the actuator, the valve being controlled at least partly based on the feedback from the pressure sensor. Of course the pressure sensor being located between the valve and the actuator, does not necessarily mean that it is spatially located between the valve and the actuator. Rather the meaning is that it is functionally, in the fluid pressure system, located between the valve and the actuator.

In some embodiments, the test force is at least 1%, preferably at least 3%, more preferably at least 5%, most preferably at least 10%, of the actuation force. In some embodiments, the test force is not higher than 80%), preferably not higher than 60%, more preferably not higher than 30%), most preferably not higher than 15%, of the actuation force. The test force level has to be high enough to ensure that the inventive test can provide a movement of the clutch actuator. However, the test force should be low enough to not cause damage in the clutch, e.g. in the case of the blocking device being in the blocking position. An advantageous interval for the test force to actuation force ratio is 5-30%>, preferably 10-15%.

In some embodiments, the method comprises determining, at least partly based on the determination of the position of the movable actuator part, whether the movable actuator part moves in response to the test force. If the movable actuator part does not move in response to the test force, this can serve as an indication that the clutch is not in order for normal use. Preferably, the position, determined subsequently or simultaneously to the step of subjecting the movable actuator part to the test force, is a second position, and the method further comprises determining, before the step of subjecting the movable actuator part to the test force, a first position of the movable actuator part, the step of determining whether the movable actuator part moves in response to the test force being carried out partly based on the first position. In such embodiments, a movement of the movable actuator part determined based on the first and second positions, can be done without the need for providing a reference position, or an absolute position. Instead the relation between the first and second positions will allow the movement determination. This can be advantageous in clutches where positions of the movable actuator part at various operational conditions of the clutch, e.g. engaged or disengaged, depend on the level of wear of the friction parts.

Preferably, the step of determining whether the movable actuator part moves in response to the test force comprises determining whether the movable actuator part moves towards the disengagement position. In the case of detecting the presence of the blocking device in the blocking position, a movement of the movable actuator part towards the disengagement position will provide a safe indication that the blocking device is removed from the blocking position.

DESCRIPTION OF DRAWINGS

Below embodiments of the invention will be described with reference to the drawings in which.

DETAILED DESCRIPTION

Figure 1:
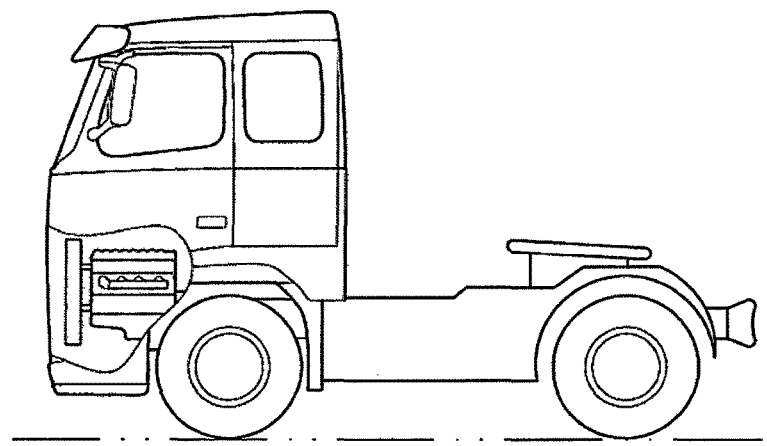
FIG. 1 shows a truck with a clutch as depicted in FIG. 2.
Figure 2:
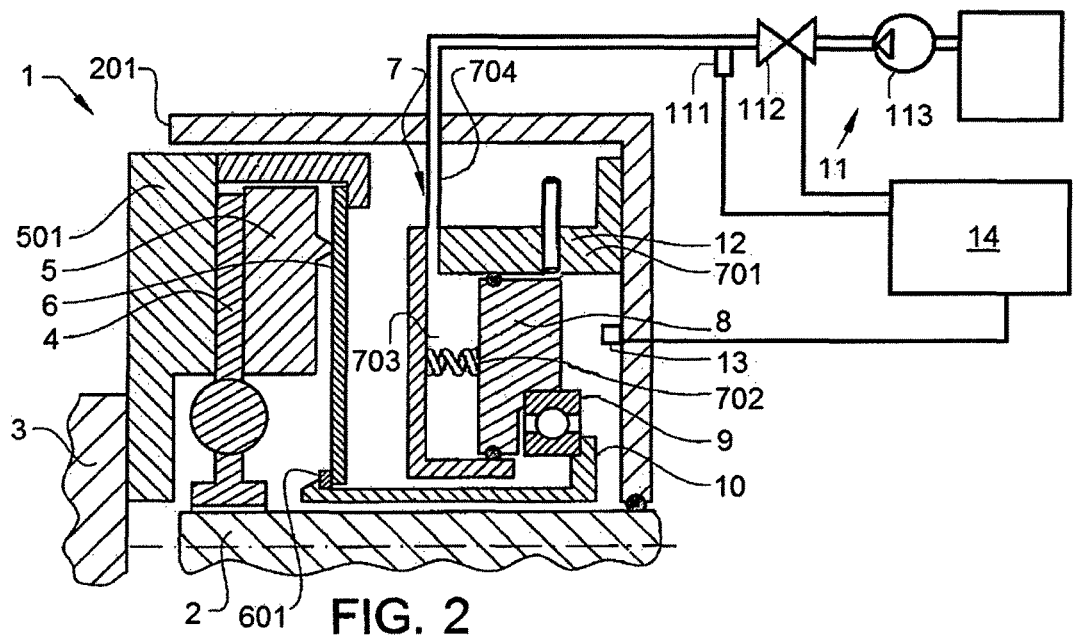
FIG. 2 shows a schematic cross-section of a part of the clutch, the cross-section being oriented in parallel with a rotational axis of the clutch, and also parts of a control system for the clutch.

FIG. 1 shows a vehicle in the form of a truck comprising a pull-type friction clutch. FIG. 2 shows in a cross-sectional view of a part of the clutch 1. The clutch is adapted to connect a first rotatable axle 2 in the form of a transmission shaft, and a second rotatable axle 3 in the form of a crankshaft of an engine. A first friction part 4 in the form of a disc is rotationally connected to the transmission input shaft 2 with a spline connection so that it can move in the axial direction in relation to the transmission input shaft. The disc 4 is arranged to be pressed axially and clamped by a spring system 6 between a second friction part 5 and a third friction part 501, both in the form of friction plates. The third friction part 501 is fixed to the crankshaft 3 via a flywheel while the second friction part 5 is rotationally connected but can move axially in relation to the crankshaft. Thereby the second friction part 5 can move between positions of engagement and disengagement with the first friction part 4 so as to engage and disengage to clutch.

The spring system comprises a spring element 6 of a diaphragm type, in the form of a round plate with a circular hole centred in the middle through which the first axle 2 extends. At the rim of the circular hole the spring element 6 is provided with a snap ring 601, described closer below. At its periphery the spring element 6 is connected to the crankshaft 3. The spring element 6 is adapted to bias the second friction part 5 into engagement with the first friction part 4, so as for the first friction part to be clamped between the second and third friction parts 5, 501, to connect the first and second axles 2, 3.

The clutch comprises an actuator 7 which is activated by fluid. It can be e.g. pneumatic or hydraulic. The actuator 7 comprises an actuator housing 701, a piston 8, a release bearing 9, a pulling tube 10, and a preload spring 702. The preload spring 702 applies a small load in order to protect the release bearing 123 from damage due to vibrations.

The actuator housing 701 is fixed to a transmission housing 201. The piston 8, the release bearing 9 and the pulling tube 10 are connected axially, and form parts of a movable actuator part. The piston 8 is non-rotatable while the pulling tube 10 is adapted to rotate by being connected at one end to the piston 8 via the release bearing 9. The pulling tube 10 is at its other, free end engaged with the snap ring 601 at the rim of the hole of the spring element 6 as described below.

A fluid chamber 703 is formed between the actuator housing 701 and piston 8. Fluid can be filled and evacuated via a conduit 704 which is part of an actuator control system 11. The piston 8 and the pulling tube 10 are axially fixed so that a fluid pressure acting on the piston 8 forces the pulling tube 10 to pull on the spring element 6. Thus, the movable actuator part 8, 9, 10 which is engaged with the spring element 6, can move axially to provide a disengagement force deforming the spring element 6. Thereby, the second friction part 5 is disengaged from the first friction part 4 to disconnect the first and second axles 2, 3.

Figure 3:
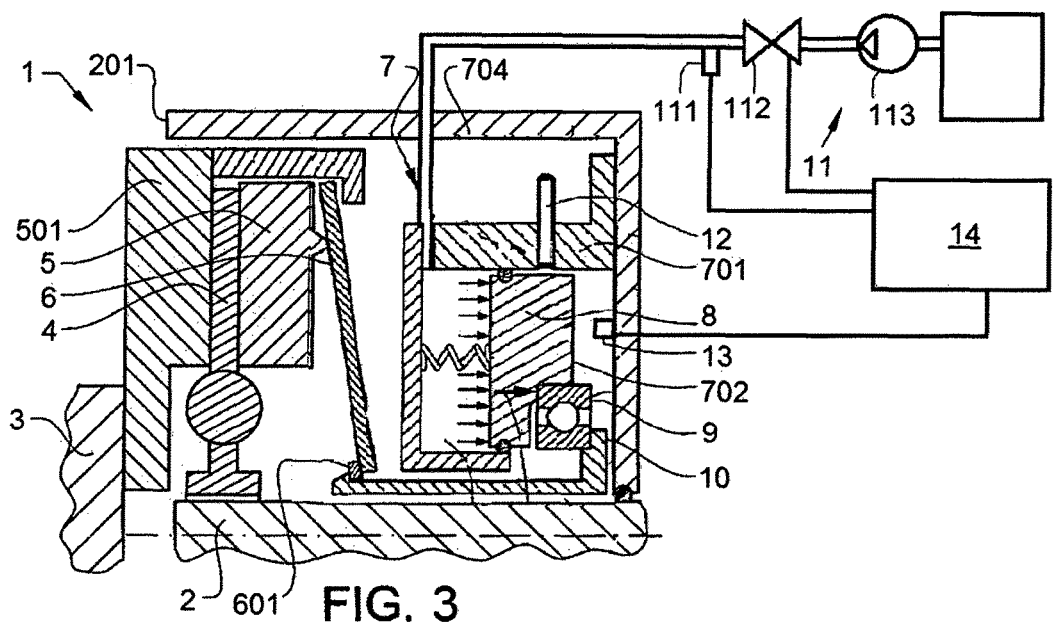
FIG. 3 shows the vehicle clutch part in FIG. 2 when the clutch is in a disengaged mode.

FIG. 3 shows the clutch 1 in a disengaged state. Pressurized fluid has been entered into the fluid chamber 703, exerting an axial actuation force to the right in the figure on the piston 8. In turn, this actuation force is transmitted via the release bearing 9, the pulling tube 10, and snap ring 601 to the spring element 6. The actuation force moves the movable actuator part 8, 9, 10 to a disengagement position shown in FIG. 3. Thereby, the second friction part 5 is released, and the driven disc 4 is no longer clamped. I.e., in the disengagement position, the friction parts are disengaged. Hence, the engine crankshaft 3 and transmission input shaft 2 are no longer drivingly connected, and they can rotate independently of each other.

As can be seen in FIG. 2 and FIG. 3 the actuator control system 11 comprises a valve 112 in the conduit 704 for controlling access of pressure from a pump or a compressor 113 in the fluid chamber 703. A release valve, not shown, is provided for releasing the pressure in the fluid chamber 703 for engaging the clutch 1. A pressure sensor 111 is provided in the conduit 704, between the valve 112 and the fluid chamber 703. The pressure sensor 111 is adapted to feed a controller 14 with signals corresponding to the pressure in the conduit 704. The controller 14 is adapted to control the valve 112, and thereby the pressure in the fluid chamber 703, based on the feedback from the pressure sensor 111.

As can also be seen in FIG. 2 and FIG. 3, a position sensor 13 is provided in the clutch 1, and is adapted to feed to the controller signals corresponding to the position of the movable actuator part 8, 9, 10. The position sensor 13 could be a slide potentiometer or any other suitable kind of position sensor.

Figure 4:
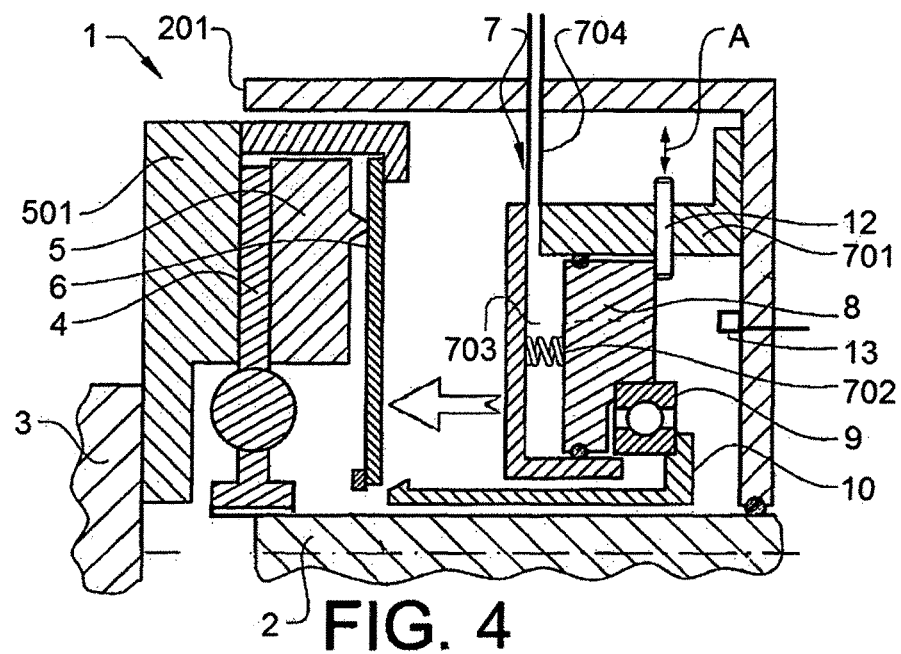
FIG. 4 and FIG. 5 show the vehicle clutch part in FIG. 2 during assembly of the clutch.
Figure 5:
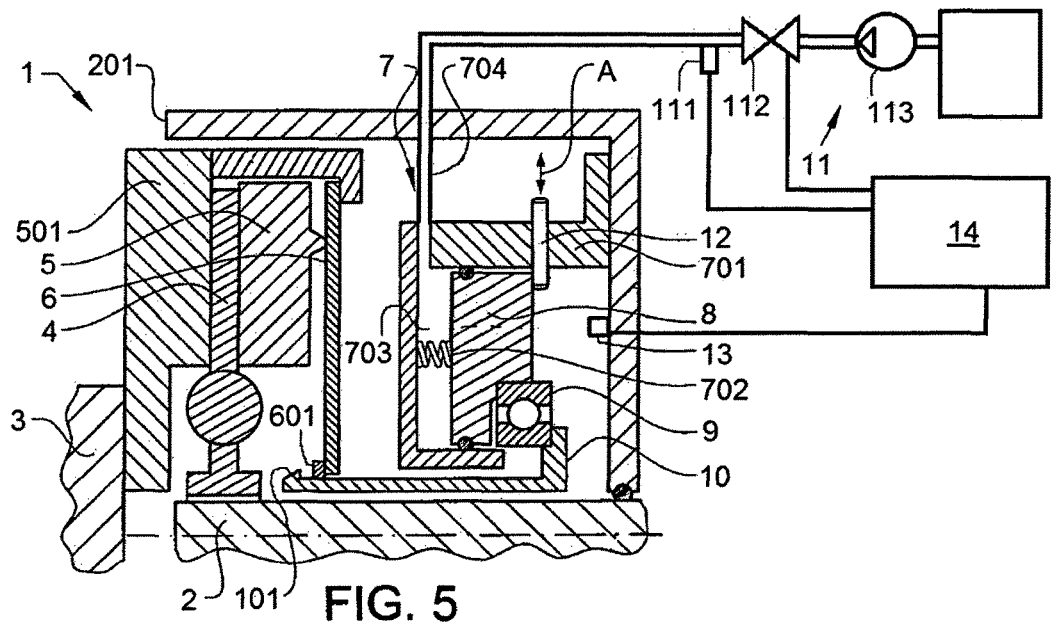

FIG. 4 and FIG. 5 show a manner, described in detail in DE102013217592A1, for assembling the clutch. At the assembly of the transmission to the engine, the end of the pulling tube 10 to the left in FIG. 4 must enter and connect axially with the snap ring 601, as described closer below. A certain force is required for the pulling tube 10 to engage the snap ring 601, and therefore movement of the movable actuator part 8, 9, 10 towards the disengagement position, to the right in the figure, has to be prevented during the assembly. For this purpose a blocking device 12 is adapted to assume a blocking position in which it prevents, restricts, or blocks the movement of the movable actuator part 8, 9, 10 towards the disengagement position.

The blocking device 12 is in this example provided in the form of a pin 12 which extends through the actuator housing 701. It should be noted that even if the blocking device 12 is in the blocking position, the movable actuator part 8, 9, 10 might be able to move from a position towards left in FIG. 2, up to a position in which it is in contact with the blocking device 12.

Reference is made to FIG. 5 showing the assembled condition of the clutch. It also shows a position in which the movable actuator part 8, 9, 10 is in contact with the blocking device 12, herein referred to as the obstruction position. Thus, the obstruction position, shown in FIG. 5, is as close to the disengagement position, shown in FIG. 3, as the movable actuator part 8, 9, 10 can be when the blocking device 12 is in the blocking position. Since the obstruction position is not dependent upon the wear condition of the clutch, it can be used as a fixed reference position by the controller.

It should be noted that in the obstruction position shown in FIG. 5, a bevelled snap flange 101 at the free end of the pulling tube 10 is not in contact with the snap ring 601 of the spring element 6. The reason is that during the clutch assembly, in order for the snap flange 101 to pass the snap ring 601, the snap flange 101 provides a slight deformation of the snap ring 601 and/or the remaining part of the spring element 6. Thereafter the snap ring 601 and/or the remaining part of the spring element 6 "snaps" back to a non-deformed position. As a result, there will be a distance between the snap flange 101 and the snap ring 601.

This distance between the snap flange 101 and the snap ring 601 upon clutch assembly depends on the wear condition of the clutch. For example, if the clutch is new, the friction parts 4, 5, 501 will be relatively thick and the spring element 6 will be biased by the friction elements 4, 5, 501 towards the right in FIG. 5. As a result, the distance between the snap ring 601 and the snap flange 101 will be relatively large upon clutch assembly. However, if the friction parts 4, 5, 501 are worn, e.g. in a used clutch undergoing service, so that they have reduced thicknesses, the snap ring 601 will be closer to the snap flange 101 upon assembly.

As indicated with the double arrow A in FIG. 5, the blocking device 12 is adapted to be moved from the blocking position to a non-blocking position, shown in FIG. 2 and FIG. 3, in which it allows the movement of the movable actuator part 8, 9, 10 towards the disengagement position.

It should be noted that the blocking device can be provided in a number of alternative manners, for example according to any of the embodiments in DE 102013217592 A1, incorporated herein by reference.

When the blocking device 12 is moved to the non-blocking position upon clutch assembly, the movable actuator part 8, 9, 10 might move away from the friction parts 4, 5, 501, biased by the preload spring 702, until the snap flange 101 comes into contact with the snap ring 601. This position is shown in FIG. 2. However, it is also possible that the movable actuator part 8, 9, 10 remains in the obstruction position shown in FIG. 5 when the blocking device 12 has been removed. The reason for this could be that the preload spring does not provide enough force to move the movable part 8, 9, 10.

Figure 6:
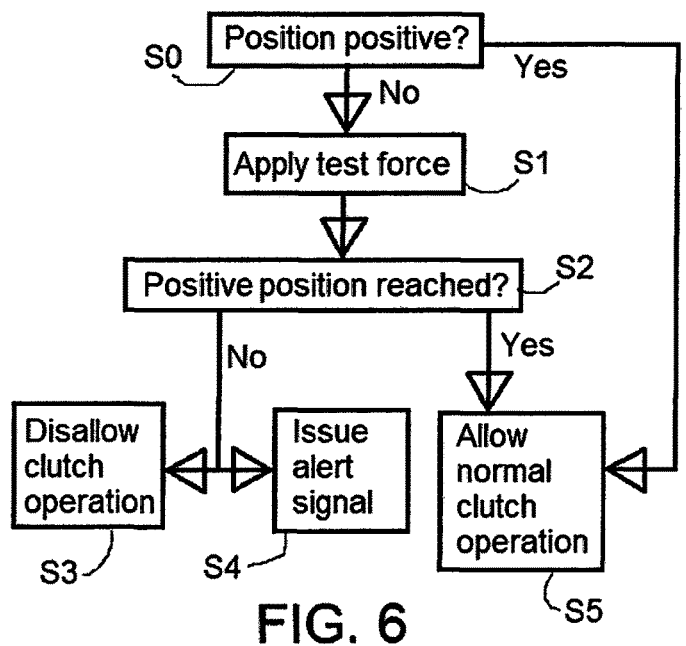
FIG. 6 depicts steps in a method according to an embodiment of the invention.

In order to ensure that, after assembly, normal use of a clutch is not attempted unless the blocking device has been removed, a method is performed as follows:

Reference is made to FIG. 6. The controller 14 is adapted to sort the positions of the movable actuator part 8, 9, 10 into two categories. A first category includes the obstruction position shown in FIG. 5, the obstruction position providing the function of a fixed reference position, and any position closer to the second axle 3 than the obstruction position. The positions in the first category are herein denoted as negative positions. A second category includes any position which is further away from the second axle 3 than the obstruction position shown in FIG. 5. The positions in the second category are herein denoted as positive positions.

The controller 14 determines with the aid of the position sensor 13, the position of the movable actuator part 8, 9, 10, as suggested by step SO in FIG. 6. If the position is positive, this indicates that the blocking device 12 is in the non-blocking position, and normal operation of the clutch is allowed, as suggested by step S5 in FIG. 6.

However, if it is determined in step SO that the position is negative, the following steps are carried out: Based on feedback from the pressure sensor 111, the controller 14 adjusts the valve 112 so as to subject the movable actuator part 8, 9, 10 to a test force; see step S1 in FIG. 6. The test force is smaller than the actuation force, described above, for disengaging the clutch. Still, the test force is large enough to urge the movable actuator part 8, 9, 10 towards the disengagement position, so that the snap flange 101 is brought into contact with the snap ring 601, (FIG. 5, FIG. 2).

Using the position sensor 13, the controller 14 can determine whether the movable actuator part 8, 9, 10 moves towards the disengagement position (FIG. 3) in response to the test force.

More specifically, as suggested at S2 in FIG. 6, it is determined whether the movable actuator part 8, 9, 10 is, upon application of the test force, in a positive position, shown in FIG. 2, between the obstruction position, shown in FIG. 5, and the disengagement position, shown in FIG. 3.

Determining whether the movable actuator pan is upon application of the test force in a positive position (FIG. 2), between the obstruction position (FIG. 5) and the disengagement position (FIG. 3), will provide an indication whether the blocking device is in the blocking position.

Controlling the valve 112, at least partly based on the feedback from the pressure sensor 111, provides for an accurate control of the test force. This is important, since the test force should be large enough to provide a movement of the movable actuator part to a positive position, while it should be small enough to not cause damage in the clutch, e.g. in the case of the blocking device being in the blocking position. An advantageous interval for the test force to actuation force ratio is 5-30%, preferably 10-15%.

If the movable actuator part 8, 9, 10 is not upon application of the test force in a positive position the controller prevents the actuator control system 11 to subject the movable actuator part 8, 9, 10 to the actuation force, as suggested at step S3 in FIG. 6. Thereby it is ensured that the clutch is not operated if the blocking device is the blocking position, whereby damage can be avoided. Also, as suggested at step S4 in FIG. 6, a signal is issued on the dashboard of the vehicle to alert a driver. However, if the movable actuator part 8, 9, 10 moves to a positive position (FIG. 2) in response to the test force, the controller allows normal operation of the clutch, as suggested at step S5 in FIG. 6.

It should be noted that in alternative embodiments, the step SO of initially determining the position of the movable actuator part can be omitted. In such embodiments, the test force will be applied regardless of whether the movable actuator part is already in a positive position.

It should also be noted that the method involving subjecting the movable actuator part 8, 9, 10 to a test force, and determining, upon application of the test force, the position of the movable actuator part 8, 9, 10, can be used for some other purpose than ensuring that the blocking device is not interfering with normal use of the clutch. For example, it can be used to determine the condition of the actuator control system 11.

Further, it should be noted that the method can be applied to any kind of clutch, for example where the actuator 7 is of non-fluid type, e.g. an electromechanical actuator.

Figure 7:
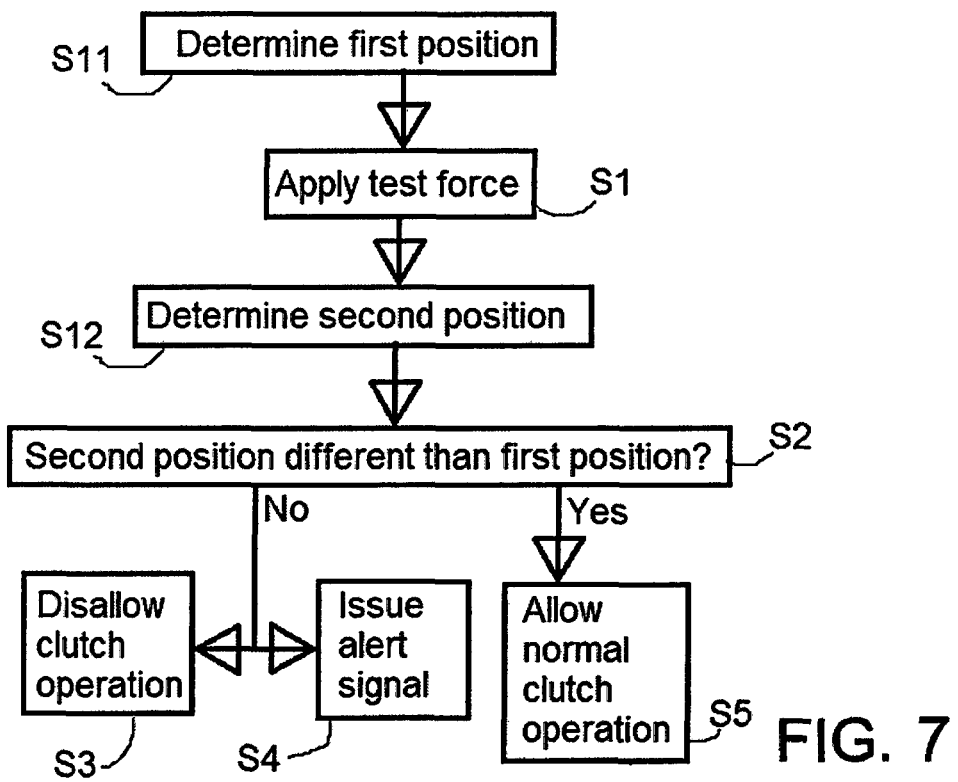
FIG. 7 depicts steps in a method according to an alternative embodiment of the invention.

Reference is made to FIG. 7. In an alternative embodiment, the controller 14 determines a first position of the movable actuator part 8, 9, 10, as indicated by step S11. Then a test force is applied to the movable actuator part as described above, S1. Subsequently, a second position of the movable actuator part 8, 9, 10 is determined, as indicated by step S12. Based on the first and second positions, it is determined whether the movable actuator part 8, 9, 10 moves in response to the test force. More specifically it is determined whether the second position is different from the first position, S2.

If the second position is not different from the first position, this serves as an indication that the clutch is not in order for normal operation, e.g. due to some damage. The controller 14 then prevents the actuator control system 11 to subject the movable actuator part 8, 9, 10 to the actuation force, as suggested at step S3 in FIG. 7. Thereby operation of the clutch can be avoided if the clutch is not in order for it. Also, as suggested at step S4 in FIG. 7, a signal is issued on the dashboard of the vehicle to alert a driver. However, if the second position is different from the first position, the controller allows normal operation of the clutch, as suggested at step S5 in FIG. 7.

The invention claimed is:

1. A method for controlling a friction clutch for connecting first and second rotatable axles in a vehicle, where the clutch comprises
   a first friction part which is connected to the first axle,
   a second friction part which is connected to the second axle,
   a spring element which is adapted to bias the second friction part into engagement with the first friction part to connect the first and second axles, and
   an actuator comprising a movable actuator part which is engageable with the spring element, and adapted to move, upon being subjected to an actuation force from an actuator control system, towards a disengagement position, thereby deforming the spring element to disengage the second friction part from the first friction part to disconnect the first and second axles,
the method comprising
   subjecting the movable actuator part to a test force urging the movable actuator part towards the disengagement position, the test force being smaller than the actuation force, and
   subsequently or simultaneously to subjecting the movable actuator part to the test force, determining a position of the movable actuator part,
   determining, based on the determined position, whether to prevent the actuator control system to subject the movable actuator part to the actuation force.

2. The method according to claim 1, where the clutch comprises a blocking device adapted to assume a blocking position in which it prevents the movement of the movable actuator part towards the disengagement position, and a non-blocking position in which it allows the movement of the movable actuator part towards the disengagement position, the method further comprising determining, based on the determination of the position of the movable actuator part, whether the blocking device is in the blocking position.

3. The method according to claim 1, comprising comparing the determined position to a fixed reference position.

4. The method according to claim 3, where the clutch comprises a blocking device adapted to assume a blocking position in which it prevents the movement of the movable actuator part towards the disengagement position, and a non-blocking position in which it allows the movement of the movable actuator part towards the disengagement position, the reference position being as close to the disengagement position as the movable actuator part can be when the blocking device is in the blocking position.

5. The method according to claim 1, where the clutch comprises a blocking device adapted to assume a blocking position in which it prevents the movement of the movable actuator part towards the disengagement position, and a non-blocking position in which it allows the movement of the movable actuator part towards the disengagement position, comprising determining whether the determined position is between the disengagement position and an obstruction position, the obstruction position being as close to the disengagement position as the movable actuator part can be when the blocking device is in the blocking position.

6. The method according to claim 5, wherein, if the blocking device is in the non-blocking position, the test force moves the movable actuator part so that the movable actuator part becomes biased against the spring element.

7. The method according to claim 1, comprising determining, based on the determined position, whether to issue an alert signal for an operator of the clutch.

8. The method according to claim 1, wherein the movable actuator part is subjected to the test force using the actuator control system.

9. The method according to claim 1, wherein determining a position of the movable actuator part is carried out by means of a position sensor.

10. The method according to claim 1, where the actuator control system comprises a fluid pressure system, and the test force is controlled at least partly based on feedback from a pressure sensor in the fluid pressure system.

11. The method according to claim 10, wherein the test force is controlled by means of a valve in the fluid pressure system, the pressure sensor being located between the valve and the actuator, the valve being controlled at least partly based on the feedback from the pressure sensor.

12. The method according to claim 1, wherein the test force is at least 1% of the actuation force.

13. The method according to claim 1, wherein the test force is not higher than 80% of the actuation force.

14. The method according to claim 1, comprising determining, at least partly based on the determination of the position of the movable actuator part, whether the movable actuator part moves in response to the test force.

15. The method according to claim 14, wherein the position, determined subsequently or simultaneously to the step of subjecting the movable actuator part to the test force, is a second position, and the method further comprises determining, before the step of subjecting the movable actuator part to the test force, a first position of the movable actuator part, the step of determining whether the movable actuator part moves in response to the test force being carried out partly based on the first position.

16. The method according to claim 14, wherein the step of determining whether the movable actuator part moves in response to the test force comprises determining whether the movable actuator part moves towards the disengagement position.

17. A computer comprising a computer program for performing, when the program is run on the computer, a method for controlling a friction clutch for connecting first and second rotatable axles in a vehicle, where the clutch comprises
a first friction part which is connected to the first axle,
a second friction part which is connected to the second axle,
a spring element which is adapted to bias the second friction part into engagement with the first friction part to connect the first and second axles, and
an actuator comprising a movable actuator part which is engageable with the spring element, and adapted to move, upon being subjected to an actuation force from an actuator control system, towards a disengagement position, thereby deforming the spring element to disengage the second friction part from the first friction part to disconnect the first and second axles,
the method comprising
subjecting the movable actuator part to a test force urging the movable actuator part towards the disengagement position, the test force being smaller than the actuation force, and
subsequently or simultaneously to subjecting the movable actuator part to the test force, determining a position of the movable actuator part,
determining, based on the determined position, whether to prevent the actuator control system to subject the movable actuator part to the actuation force.

18. A controller configured to perform a method for controlling a friction clutch for connecting first and second rotatable axles in a vehicle, where the clutch comprises
a first friction part which is connected to the first axle,
a second friction part which is connected to the second axle,
a spring element which is adapted to bias the second friction part into engagement with the first friction part to connect the first and second axles, and
an actuator comprising a movable actuator part which is engageable with the spring element, and adapted to move, upon being subjected to an actuation force from an actuator control system, towards a disengagement position, thereby deforming the spring element to disengage the second friction part from the first friction part to disconnect the first and second axles,
the method comprising
subjecting the movable actuator part to a test force urging the movable actuator part towards the disengagement position, the test force being smaller than the actuation force, and
subsequently or simultaneously to subjecting the movable actuator part to the test force, determining a position of the movable actuator part,
determining, based on the determined position, whether to prevent the actuator control system to subject the movable actuator part to the actuation force.

* * * * *